(12) United States Patent
Osterkamp et al.

(10) Patent No.: US 11,531,952 B1
(45) Date of Patent: Dec. 20, 2022

(54) SECURE AND ANONYMIZED DIGITAL TRANSACTIONS

(71) Applicant: UIPCO, LLC, San Antonio, TX (US)

(72) Inventors: Bryan J. Osterkamp, New Braunsfels, TX (US); Cory A. Matheson, Celina, TX (US); Curtis Mark Bell, San Antonio, TX (US); Ashley Raine Philbrick, San Antonio, TX (US); Nathan Lee Post, Rockport, TX (US); Noe Albert Martinez, San Antonio, TX (US); David M. Jones, Jr., San Antonio, TX (US); Oscar Guerra, San Antonio, TX (US); Janelle Denice Dziuk, Falls City, TX (US); Zachery C. Lake, Aubrey, TX (US); Yevgeniy Viatcheslavovich Khmelev, San Antonio, TX (US)

(73) Assignee: United Services Automobile Association (USAA), San Antonio, TX (US)

(*) Notice: Subject to any disclaimer, the term of this patent is extended or adjusted under 35 U.S.C. 154(b) by 218 days.

(21) Appl. No.: 16/942,329

(22) Filed: Jul. 29, 2020

Related U.S. Application Data (60) Provisional application No. 62/880,922, filed on Jul. 31, 2019.

(51) Int. Cl.
*G06Q 30/00* (2012.01)
*G06Q 10/08* (2012.01)
(Continued)

(52) U.S. Cl.
CPC ......... *G06Q 10/083* (2013.01); *G06K 7/1413* (2013.01); *G06K 7/1417* (2013.01); *G06Q 20/383* (2013.01); *G06Q 20/401* (2013.01)

(58) Field of Classification Search
None
See application file for complete search history.

(56) References Cited

U.S. PATENT DOCUMENTS

| 9,773,212 B2 * | 9/2017 | Hammad | G06Q 10/00 |
| 2002/0013739 A1 * | 1/2002 | O'Donnell | G06Q 30/0635 |
| | | | 705/26.81 |

(Continued)

*Primary Examiner* — Kambiz Abdi
*Assistant Examiner* — Christopher Stroud
(74) *Attorney, Agent, or Firm* — Fletcher Yoder, P.C.

(57) ABSTRACT

Described herein are methods and systems for anonymizing and securing digital transactions. These methods and systems describe a server that monitors web applications executing on a user device. Responsive to the web application displaying an input element requesting personally identifiable information of a user, the server inputs encoded user data corresponding to the input element, whereby a web application server hosting the web application does not receive the personally identifiable information of the user. The server then generate an optical code representing the personally identifiable information. Responsive to receiving a request for the personally identifiable information from a shipping entity computing device that scanned the optical code, the server first verifies the shipping entity computing device and then presents the personally identifiable information for display on the shipping entity computing device.

20 Claims, 8 Drawing Sheets

(51) Int. Cl.
*G06K 7/14* (2006.01)
*G06Q 20/40* (2012.01)
*G06Q 20/38* (2012.01)

(56) References Cited

U.S. PATENT DOCUMENTS

| | | | | |
|---|---|---|---|---|
| 2013/0332277 | A1* | 12/2013 | Faith | G06Q 30/0239 |
| | | | | 705/14.54 |
| 2014/0304157 | A1* | 10/2014 | Bachenheimer | G06Q 20/02 |
| | | | | 705/44 |
| 2014/0372334 | A1* | 12/2014 | Wrentmore | G06Q 10/083 |
| | | | | 705/330 |
| 2016/0036809 | A1* | 2/2016 | Bhimanaik | H04L 63/102 |
| | | | | 726/4 |
| 2017/0193428 | A1* | 7/2017 | Abrams | G06Q 10/083 |
| 2019/0066176 | A1* | 2/2019 | Warman | G06Q 30/0615 |
| 2019/0318300 | A1* | 10/2019 | Cox | G06Q 10/0633 |

* cited by examiner

Enter a new shipping address — 311

- Full name: _______________ 310
- Address line 1: _______________
- 321 Address line 2: _______________ 320
- City: _______________
- State/Province/Region: _______________
- ZIP: _______________
- Country/Region: _______________
- Phone number: _______________   Learn More Add delivery instructions (optional)

Do we need additional instructions to find this address?

[                                                           ]

Do we need a security code or a call box number to access this building?

[                                                           ]

Weekend delivery:
∨ Which days can you receive packages?

☐ Use as my default address.

Make sure your address is correct
If the address contains typos or other errors, your package may be undeliverable.
Tips for entering addresses | APO/FPO address tips

[ Submit ]  [ Cancel ]

Enter a new shipping address

| | |
|---|---|
| Full name | XABBKHFRTG |
| Address line 1: | 112255 sdGERGHER |
| 321 Address line 2: | 320 %^Uwegdh |
| City | hytgfrthhh |
| State/Province/Region: | TX |
| ZIP: | 528981 |
| Country/Region: | UGHHSHS |
| Phone number: | 9874128555 | Learn More |

Add delivery instructions (optional)

Do we need additional instructions to find this address?

Yujthrgwds3564758i9ukbey4785tyh8rgthlfdjhjhvb,bfdbjhfdgbjhvbjhvf

Do we need a security code or a call box number to access this building?

588

Weekend delivery:
∨ Which days can you receive packages?

☐ Use as my default address.

Make sure your address is correct
If the address contains typos or other errors, your package may be undeliverable.
Tips for entering addresses | APO/FPO address tips

[ Use this address ] [ Cancel ]

*FIG. 5B*

SECURE AND ANONYMIZED DIGITAL TRANSACTIONS

RELATED CASES

This case claims priority to provisional patent application U.S. Pat. App. No. 62/880,922, entitled Secure and Anonymized Digital Transactions, filed on Jul. 31, 2019, which is herein incorporated by reference in its entirety.

TECHNICAL FIELD

The present disclosure relates generally to online securing and anonymizing digital interactions including digital transactions.

BACKGROUND

With the advent of electronic commerce, consumers are increasingly purchasing products and services from web merchants. Online shopping typically involves consumers entering personally identifiable information or PII (e.g., payment information and shipping information) into prompts displayed by the web merchant. This has generated a negative user experience.

For instance, as the processing power of computers allow for greater computer functionality and the Internet technology era allows for interconnectivity between computing systems, fraudsters have developed new ways of overriding web merchant's security protocols to access consumer data. Some web merchants require consumers to provide PII (e.g., bank account numbers, routing number) as well as identification verifications (e.g., social security, home address). These methods subject online consumers to an increased security risk. For instance, one potential risk occurs where user account related data (e.g., email addresses and passwords) at a merchant web site (or database) is hacked.

In another example, merchants may sell or otherwise provide a consumer's personal information for this transaction (e.g., address or phone number) to another company who then sends advertisements, email messages, text messages, mail, or other communications that are undesirable and unwanted by the consumer. But without providing this personal information, the consumer is unable to utilize the convenience of online shopping.

As a result, many consumers would rather not divulge their personally identifiable information (PII) to web merchant. However, existing online shopping methods do not provide an adequate option for consumer to purchase a product/service without entering their PII.

SUMMARY

For the aforementioned reasons, there is a need to reduce the security risk and negative user experience associated with digital transactions. There is a need for a new software solution to automatically and securely convey consumers' PII to web merchants without interfering in the online shopping flow of data. Disclosed herein are systems and methods capable of addressing the above described technical shortcomings. The methods and systems described herein may also provide any number of additional or alternative benefits and advantages. As described herein, embodiments of the present disclosure relate to systems, apparatuses, methods, and computer program products for anonymizing and securing digital transactions from any web page being accessed on a client device.

Among many technical advantages provided herein, the methods and systems described provide a secure way of transmitting a user's PII to a web merchant without interfering with the web merchant's processing of the transaction. Therefore, even if bad actors are able to hack into the web merchant's databases, the bad actors are still unable to obtain consumer's PII. Therefore, the methods and systems described herein provide an additional layer of security to any digital transaction without interfering with the web merchant's ability to process the transaction.

In an embodiment, a method includes monitoring, by a server via a browser extension executing on an electronic user device, a web application displayed on the electronic user device; responsive to the web application executing on the user electronic device displaying an input element requesting personally identifiable information representing a shipping destination, inputting, by the server, encoded user data corresponding to the input element, whereby a web application server hosting the web application does not receive the personally identifiable information representing the shipping destination; responsive to receiving a request for the personally identifiable information from a shipping entity server that received the encoded user data from the web application server, generating, by the server, an optical code representing the personally identifiable information; responsive to receiving a request for the personally identifiable information from a shipping entity computing device that scanned the optical code from a shipping label, verifying, by the server, the shipping entity computing device; and upon verifying the shipping entity computing device, presenting, by the server, the personally identifiable information for display on the shipping entity computing device.

In another embodiment, a computer system includes a web application server configured to execute one or more web applications on an electronic user device; a shipping entity server associated with a shipping entity computing device configured to access a user's unencrypted data; and a server in communication with the electronic user device, shipping entity, and the merchant webserver, the server configured to monitor, via a browser extension executing on the electronic user device, a web application displayed on the electronic user device; responsive to the web application executing on the user electronic device displaying an input element requesting personally identifiable information representing a shipping destination, input encoded user data corresponding to the input element, whereby the web application server hosting the web application does not receive the personally identifiable information representing the shipping destination; responsive to receiving a request for the personally identifiable information from the shipping entity server that received the encoded user data from the web application server, generating, by the server, an optical code representing the personally identifiable information; responsive to receiving a request for the personally identifiable information from a shipping entity computing device that scanned the optical code from a shipping label, verify the shipping entity computing device; and upon verifying the shipping entity computing device, present the personally identifiable information for display on the shipping entity computing device.

BRIEF DESCRIPTION OF THE DRAWINGS

Non-limiting embodiments of the present disclosure are described by way of example with reference to the accompanying figures, which are schematic and are not intended to be drawn to scale. Unless indicated as representing the background art, the figures represent aspects of the disclosure.

DETAILED DESCRIPTION

Reference will now be made to the illustrative embodiments illustrated in the drawings, and specific language will be used herein to describe the same. It will nevertheless be understood that no limitation of the scope of the claims or this disclosure is thereby intended. Alterations and further modifications of the inventive features illustrated herein, and additional applications of the principles of the subject matter illustrated herein, which would occur to one skilled in the relevant art and having possession of this disclosure, are to be considered within the scope of the subject matter disclosed herein. The present disclosure is here described in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here.

Figure 1A:
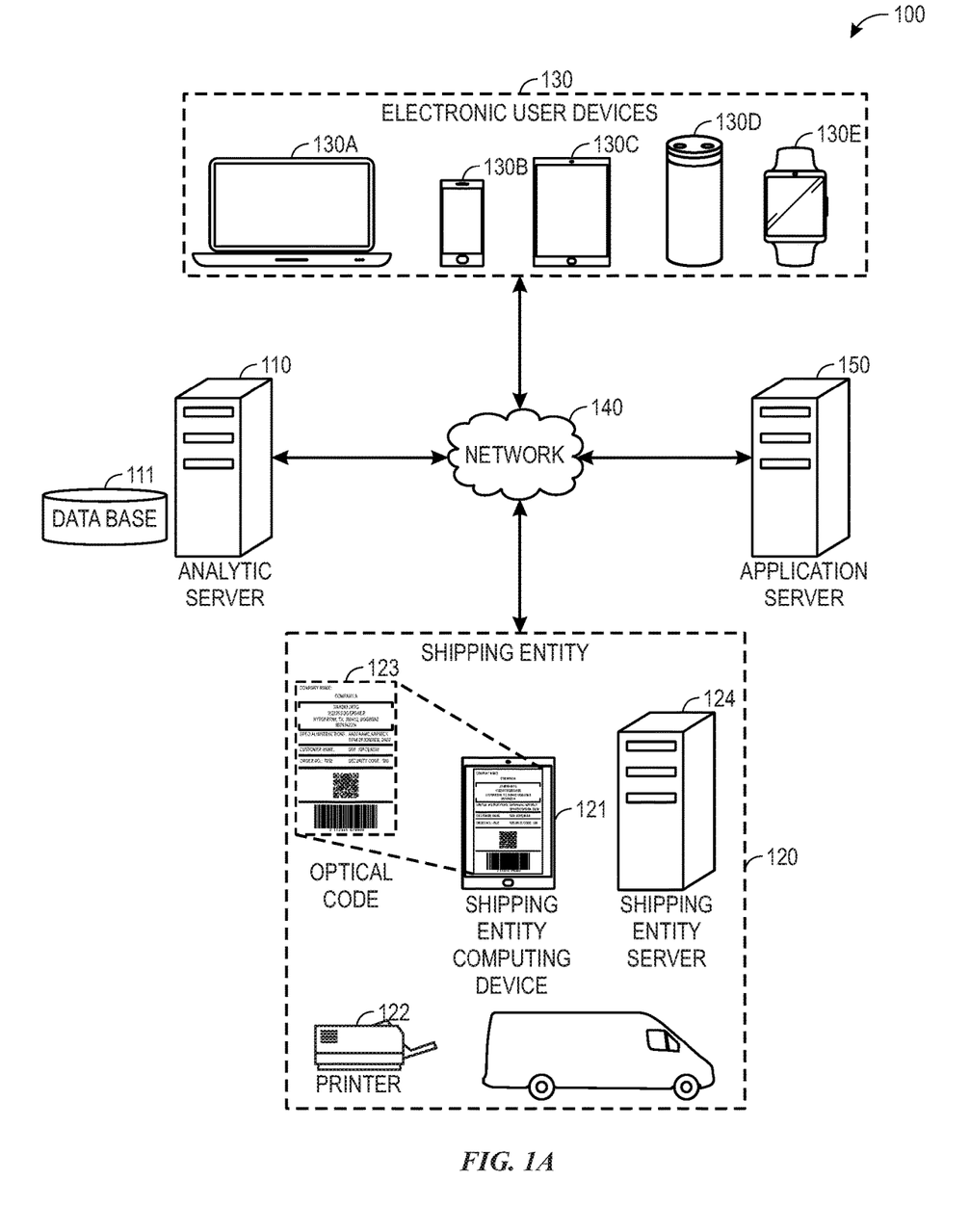
FIG. 1A illustrates components of a computer system for securing and anonymizing digital transactions, according to an embodiment.

FIG. 1A shows components of a system 100 for anonymizing and securing digital transactions, according to an embodiment. The system 100 may include analytics server 110, database 111, a shipping entity server 124, shipping entity computing device 121, and shipping entity printer 122 (collectively shipping entity 120), electronic user devices 130a-e (collectively electronic user devices 130), and the application server 150. In some configurations, the above-described features are connected to each other through a network 140. The examples of the network 140 may include, but are not limited to, private or public LAN, WLAN, MAN, WAN, and the Internet. The network 140 may include both wired and wireless communications according to one or more standards and/or via one or more transport mediums.

The communication over the network 140 may be performed in accordance with various communication protocols such as Transmission Control Protocol and Internet Protocol (TCP/IP), User Datagram Protocol (UDP), and IEEE communication protocols. In one example, the network 140 may include wireless communications according to Bluetooth specification sets, or another standard or proprietary wireless communication protocol. In another example, the network 140 may also include communications over a cellular network, including, e.g. a GSM (Global System for Mobile Communications), CDMA (Code Division Multiple Access), EDGE (Enhanced Data for Global Evolution) network.

In operation, users may use the electronic user devices 130 to access a web page on a web application (e.g., browser application) installed on the user devices 130. The web page may correspond (e.g., be a part of) to a merchant's web site. In some configurations, the applications server 150 may host the web page for the web merchant. Therefore, the web applications server 150 may be directly or indirectly associated with the web merchant from which the users are requesting products or services. In some embodiments, the web merchant may operate the application server 150. In some other configurations, the application server 150 may be a third party sever associated with the web merchant where the application server 150 is configured to host/manage the web merchant's web site (e.g., receive users' PII and process requests and transactions).

The application server 150 may be any computing device hosting any merchant's web site via the network 140. Upon the navigating the web page using the browser application executing on the electronic user devices 130, the analytics server 110 may track the users' activity on the web page. The analytics server 110 may also execute a browser extension on the electronic user devices 130 where the browser application may or may not be executing as a background process.

The analytics server 110 may query the database 111 to obtain an identity of the user operating the user devices 130. The analytics server 110 may analyze the content on the web page and how the user is interacting (e.g., navigating) with the web page displayed. Upon determining that the browser application has displayed a web page having one or more input elements requesting PII, the analytics server 110 may generate encrypted user data. As described herein, an input element is any graphical components displayed on a web application that is configured to receive an input from a user (e.g., string input field, radio button, and drop-down menu). As will be described below, the analytics server 110 may execute various encryption protocols transmit the encrypted files to ensure that the digital transaction is performed in a secure and anonymized manner.

The analytics server 110 may identify that an input element is requesting the user's PII by identifying a hypertext markup language (HTML) code of a particular web page, using web scraping, or recognizing the URL of the web page that presents such an input element on the electronic user devices 130. The analytics server 110 may then auto-import user data associated with the input element, such as the user's address. In some embodiments, a user has an existing account accessible to the analytics server 110 where the user data is stored within the system database 111. As will be described below, the analytics server 110 may then transmit the encrypted data to the application server 150.

The analytics server 110 may be any computing device comprising a processor and non-transitory machine-readable storage capable of executing the various tasks and processes described herein. Non-limiting examples of such computing devices may include workstation computers, laptop computers, server computers, laptop computers, and the like. While the system 100 includes a single analytics server 110, one having skill in the art would appreciate that in some embodiment, the analytics server 110 may include any number of computing devices operating in a distributed computing environment.

The electronic user devices 130 may be any portable or non-portable device, such as a desktop computer, laptop computer, tablet computer, smart phone, smart watch, gaming console, personal digital assistant, and the like. The electronic user devices 130 may be any computer with a processor/microcontroller and/or any other electronic component that performs one or more operations according to one or more programming instructions. The electronic user devices 130 may be capable of communicating with the analytics server 110 (directly or through a browser extension) and with the application server 150 through the communications network 140 using wired or wireless communication capabilities.

The electronic user devices 130 may include one or more input/output devices to allow user interaction with one or more web pages and/or programs of the analytics server 110 and/or the application server 150 to assist users conduct digital transactions (e.g., perform online purchases). In one example, the electronic user devices 130 may execute a browser application 112 that accesses and presents a web application executed by the application server 150 that allows a user to select one or more items/products sold by a web merchant. Examples of the browser application may include, but are not limited to, Mozilla Firefox®, Microsoft® Internet Explorer, Google® Chrome, and Apple Safari®. The term "online," as used herein, refers to activities that occur over the network 140, including, but not limited to, accessing a web merchant's web site, social network sites, etc. Even though aspects of the embodiments described herein refer to the digital transaction as a transaction performed on a website, the methods and systems described herein can be implemented on any web application (e.g., mobile application, website, and third-party application).

The analytics server 110 may be configured to track online web activity of the user. For instance, a browser application or a browser extension may track user activity via one or more predefined executable files installed on the browser application and/or the electric user devices 130. The browser extension may execute the executable file to track the online web activity of the user based on at least one of the uniform resource locator (URL) of the web site being accessed by the user, the content of a web page of the web site being accessed, and a search query for assisting online web activity.

While the example described herein recites the browser application having a browser extension, the systems and methods described herein can be integrated into different applications (e.g., a social networking application) that request the user's PII. In an alternative embodiment, such as on a mobile client device, the functionality of the browser extension may be executed by a separate application. The executable file may be an extension, plug-in, or add-on. A web browser plugin and/or a browser extension may also augment or facilitate digital rights management between the application server 150 and the electronic user devices 130. In another example, the analytics server 110 may utilize an application programming interfaces (APIs) to monitor various web applications and users' interactions operating the electronic user devices 130.

The analytics server 110 may parse the web page accessed (e.g., being displayed) by the user on the electronic client devices 130. The analytics server 110 may parse the web page to determine whether any PII information is requested to be transmitted to the web application 150. As will be described below, the analytics server 110 may determine the input elements requesting PII by using keyword searches or alphanumerical character (sometimes referred to as characters) searches on the web page to find one or more of a plurality of keywords or characters that are pre-determined and known for requesting PII. In some embodiments, the analytics server may determine the payment transaction information based on specific URL information for the web page being accessed by the user on the electronic client devices 130.

For instance, when a user accesses the merchant web site, the analytics server 110 may determine that the user has accessed the merchant web site for performing payment transactions or to enter shipping information. The analytics server 110 may retrieve the user's browsing history, and compare URL information of the web page currently being accessed by the user with stored browsing history of the user to determine if any PII will be transmitted to the application 150.

In some embodiments, the analytics server 110 may identify at least one known keyword on the web page being accessed by the user to identify the presence of any PII request. The analytics server 110 may identify any of the known keywords on the web page by identifying a HTML, code of the particular web page, using web scraping, or recognizing the URL of the web page as one that presents such a known keyword. The at least one known keyword has one or more corresponding descriptors that define a transaction or a PII request.

Upon determining that a browser application executing on the electronic user devices 130 has loaded a web page having an input element requesting user PII, the analytics server 110 may retrieve (e.g., from database 111) and may encrypt user data corresponding to the input elements. The analytics server 110 may also input the encrypted or encoded user data into the input element. The analytics server 110 may also generate an optical code corresponding to the user data and transmit the optical code to the application server 150. In some configurations, the analytics server 110 may also instruct the application server 150 to transmit the optical code to a third-party server or entity, such as the shipping entity 120.

The application server 150 may be any computing device hosting a web site accessible to the electronics user devices 130. The application server 150 may be any computing device comprising a processor and non-transitory machine-readable storage capable of executing the various tasks and processes described herein. Non-limiting examples of such computing devices may include workstation computers, laptop computers, server computers, laptop computers, and the like. While the system 100 includes a single application server 150, one having skill in the art would appreciate that in some embodiment, the application server 150 may include any number of computing devices operating in a distributed computing environment.

The application server 150 may execute software applications configured to host a web site (e.g., Apache®, Microsoft IIS®), which may generate and serve various web pages to the electronic client devices 130. The web site may be used to generate and access data stored on a merchant database (which may be a separate database or a component of a database 111). The application server 150 may also process the user's transaction and satisfy the user's request. In a non-limiting example, the application server 150 may host a web merchant and may facilitate a web transaction for goods or services.

The database 111 may be capable of storing user profiles containing user browsing history and/or user financial data. The database 111 may be in communication with a processor of the analytics server 110 and/or the electronic user devices 130, where the processor is capable of executing the various commands of the system 100. In some embodiments, the database 111 may be part of the analytics server 110 or the electronic user devices 130. In some embodiments, the database 111 may be a separate computing feature/component in communication with the analytics server 110. In some configurations, the database 111 may be apart of the analytics server 110.

The database 111 may be hosted on any number of computing devices comprising a non-transitory machine-readable storage medium and capable of performing the various tasks described herein. As shown in FIG. 1, the database 111 may be accessed by the analytics server 110, the electronic user devices 130, and/or other servers/devices of the system 100 via the network 140. The database 111 may be hosted on the same physical computing device functioning as the analytics server 110 and/or the electronic user devices 130. In some embodiments, the database 111 may have a logical construct of data files that are stored in non-transitory machine-readable storage media, such as a hard disk or memory, controlled by software modules of a database program (for example, SQL), and a related database management system (DBMS) that executes the code modules (for example, SQL scripts) for various data queries and other management functions generated by the analytics server 110.

The shipping entity 120 may represent a collection of computing features configured to satisfy a request originated by the electronic user devices 130 and processed by the application server 150. The shipping entity 120 may include a shipping entity server 124, shipping entity computing device 121, and a printer 122. As will be described below, the analytics server 110 may generate a shipping label having an optical code 123 to the shipping entity server 124. The shipping entity server 124 may then request the analytics server 110 to decrypt the shipping label to satisfy the user's request by delivering the product to the user.

The shipping entity server 124 may be any computing device comprising a processor and non-transitory machine-readable storage capable of executing the various tasks and processes described herein. Non-limiting examples of such computing devices may include workstation computers, laptop computers, server computers, laptop computers, and the like. While the system 100 includes a single shipping entity server 124, one having skill in the art would appreciate that in some embodiment, the shipping entity server 124 may include any number of computing devices operating in a distributed computing environment.

Figure 1B:
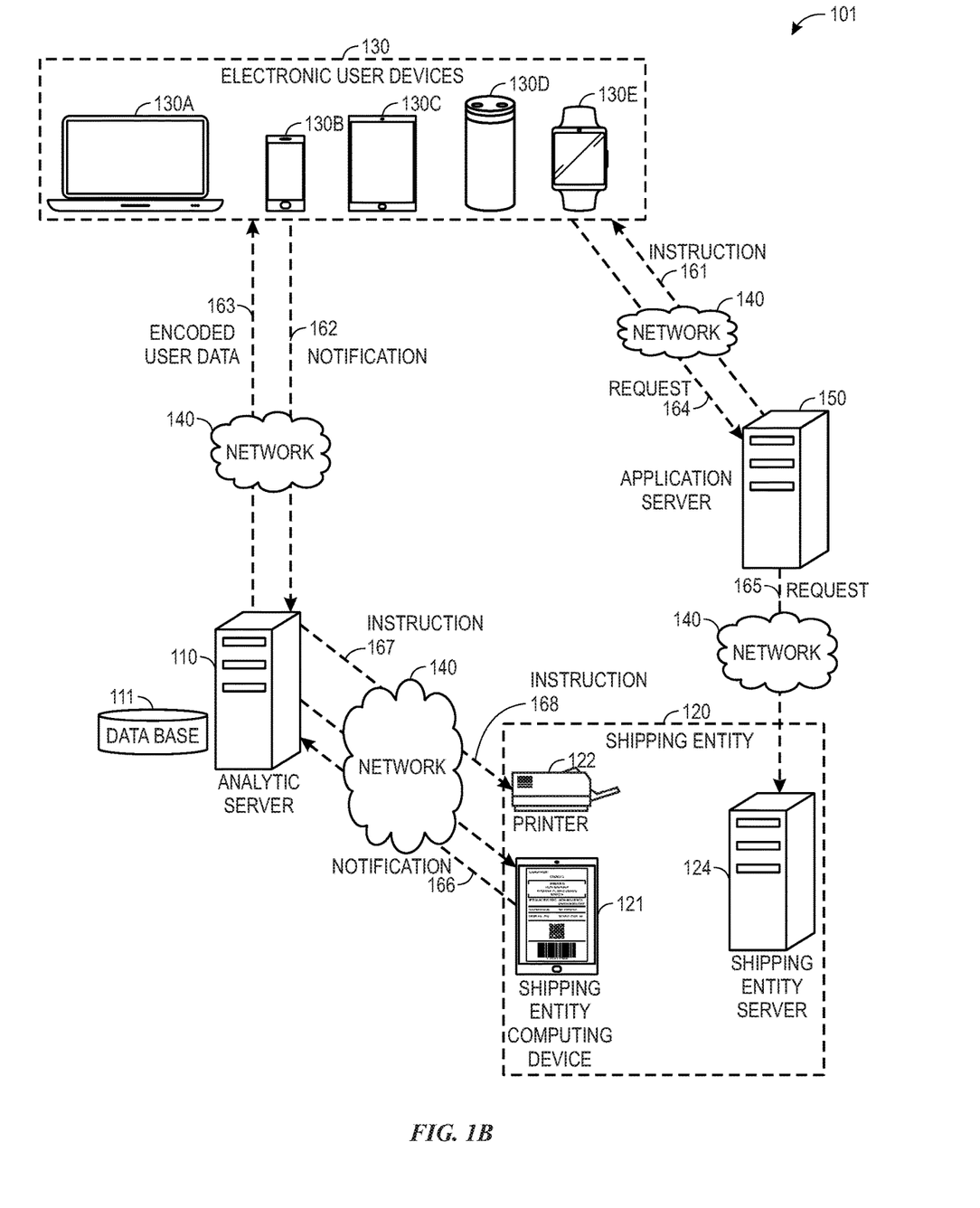
FIG. 1B illustrates a non-limiting example of the operation of the computer system for securing and anonymizing digital transactions, according to an embodiment.

FIG. 1B illustrates a non-limiting example of the operation of the computer system for securing and anonymizing digital transactions, according to an embodiment. The computing features illustrated in FIG. 1B are similar to the ones described in FIG. 1A. However, these features are rearranged for ease of understanding and clarity. The method described in FIG. 1B does not deviate from the methods and systems described in FIG. 1A. In the non-limiting example 101, the application server 150 transmits the instruction 161 to the electronic user device 130a to display a PII requesting input element. A browser application installed on the electronic user device 130a monitors the input element displayed and identifies the input element as requesting PII. The browser extension then transmits the notification 162 to the analytics server 110 that a PII requesting input element is displayed on the electronic user device 130a. The analytics server 110 then retrieves user data from the database 111, encrypts the user data, and transmits encoded data 163 to the browser extension executing on the electronic user device 130a.

The encoded user data may also include instruction for the browser extension to input the encoded data into the PII requesting input element. The encoded data may also be included in an optical code visually representing the encoded data. The electronic device 130a then generates and transmits request 164 to the application server 150. The request 164 is generated using the encoded data. Therefore, it does not include user's PII. The application server 150 then processes the request 164 and generates and transmits the request 165 to the shipping entity 120 (the shipping entity server 124).

The shipping entity also includes a shipping entity computing device 121, which accesses the optical code. The shipping entity computing device 121 then transmits notification 166 to the analytics server 110 that the shipping entity computing device has accessed the optical code and is requesting a presentation of unencrypted user data (such as PII). The analytics server then authenticates the shipping entity computing device 121 using a variety of authentication methods. Upon a successful verification, the analytics server 110 instruction 167 instructing the shipping entity computing device 121 to display unencrypted user data (such as PII). The analytics server may also transmit the instruction 168 to the printer 122 (printer of the shipping entity 120) to print the user data or a media element representing user data (e.g., shipping label).

Even though certain embodiments describing the methods and systems described herein are described within the context of a web page, the methods and systems described herein are not limited to anonymizing/securing transactions implemented on web pages. The methods and systems described herein may apply to any application requesting PII of a user, such as mobile applications, third party websites, and the like.

Even though aspects of the method and systems described herein are explained using computing features, such as a browser extension, these methods and systems are not limited to such computing features. For instance, securing and anonymizing digital transactions are applicable to all transactions facilitated via any electronic device. The methods described herein can be implemented using an extension browser and/or any application or computer-executable code executed on the electronic devices 130.

In some configurations, the methods and systems described herein can be integrated into a mobile application. For instance, the methods and systems to secure and anonymize digital transactions can be implemented using an API that is "called" by the mobile application installed on a mobile device, such as the mobile device 130b or 130c. These methods and systems can also be implemented as a component that can be built into the mobile application (e.g., via a Mobile Development Kit or MDK) that could be reused by organizations implementing this capability. Accordingly, when a user facilitates a transactions using a mobile application, the methods described herein can secure and anonymize his or her PII.

In some configurations, a user who wishes to secure his or her digital transactions, may utilize these methods to secure a transaction facilitated via a wearable electronic device 130e (e.g., wearable watch and/or wearable fitness tracking device) and/or voice control assistant device 130d (e.g., Alexa® and Google Home®). For instance, a user may audibly instruct the voice control assistant device to facilitate a digital transaction (e.g., "purchase a pack of gum").

The methods and systems described herein can be implemented such that the voice control assistant device secures and anonymizes the user's PII before transmitting the purchase order to a third-party website. Similarity, the wearable electronic device 130e may anonymize the user's PII before transmitting payment data to a point of sale system or the application server 150.

Figure 2:
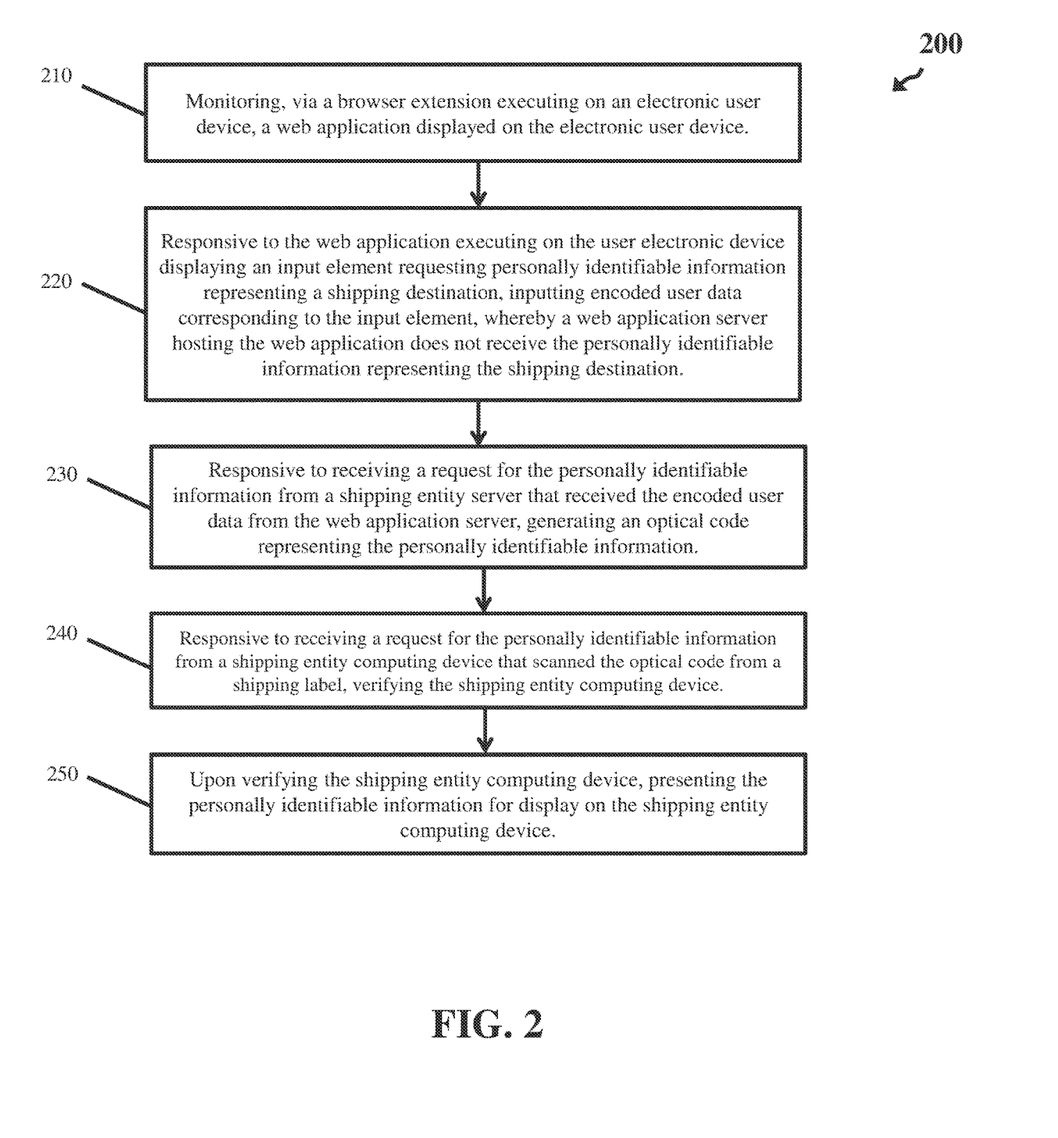
FIG. 2 is a flow diagram of an illustrative process/method for securing and anonymizing digital transactions, according to an embodiment.

FIG. 2 illustrates execution steps for securing and anonymizing digital transactions, according to a method 200. The method 200 comprises execution steps 210-250. However, other embodiments may comprise additional or alternative execution steps, or may omit one or more steps altogether. Other embodiments may perform certain execution steps in a different order; steps may also be performed simultaneously or near-simultaneously with one another. In addition, the method 200 is described as being executed by a single analytics server computer. However, in some embodiments, various steps may be executed by any number of computing devices operating in a distributed computing environment. In some configurations, a computer executing one or more steps may be programmed to execute various other, unrelated features, where such computer does not need to be operating strictly as the analytics server described herein.

At step 210, the analytics server may monitor a web application displayed on an electronic user device via a browser extension executing on the electronic user device. The analytics server may monitor multiple electronic devices and various applications executing on the electronic devices. The analytics server may communicate with various electronic devices and monitor the communications between the electronic devices and the various servers executing applications on the electronic devices.

For instance, the analytics server may monitor the data packages received and sent by each electronic device to monitor the content of what is displayed/executed on the electronic device. The communication may take any suitable form. For example, the electronic device may execute a browser application having an application and/or an executable file that enables a user to navigate to the web site. It should be noted that the embodiments of the present disclosure are not limited to use with web sites accessible via a browser application. As such, the web sites may each include any application accessible via the Internet. The analytics server may monitor all applications causing the electronic devices to perform an action, such as display a web page, a mobile version of a website, or another form of website to which a user may navigate online.

When the user performs an activity on a browser application of the electronic device, the analytics server may track the user's activity and determine navigation data of a browser application installed on the electronic device. Several techniques may be used by the analytics server to track user's activities on the electronic device, such as by tracking browser cookies, IP addresses, screen-scraping protocols, and information embedded in the URL address. In one example, the analytics server may track user activity using IP address. In another example, the analytics server may track the user activity by storing user's web browser cookies. The analytics server may store the cookies as text strings on the user's electronic device local drive, and the cookies may be sent to a system server by the analytics server for user session tracking.

In yet another example, the analytics server may track a user using information embedded in a URL string on the browser of the electronic device. The analytics server may implement the tracking process by communicating with a merchant webserver (in communication with the electronic device) appending a tracking or query string onto the URL string at the electronic device prior to sending the URL string to a browser. When a web browser accesses the content using the URL embedded with tracking information, the web browser sends the URL string back to a webserver. By monitoring the embedded information, the analytics server may track user activities and then identify a web page the user is accessing.

In some configurations, the analytics server may determine an identification of the web page being browsed (or otherwise displayed) on the electronic device. The analytics server may obtain the identity of the web page using a stored profile, cookies, IP address, and request for input of an identification, domain, URL, or any other identification method.

In some configurations, the analytics server may monitor the electronic device using an executable file (application) installed as a browser extension. The browser extension (executable file) may be executing as a background process of the electronic device. For instance, the browser extension may be transparent to the user operating the electronic device. In this way, the analytics server is able to monitor the user's online activities without disturbing the user and/or disturbing the display screen of the electronic device. The browser extension may remain in the background (e.g., transparent to the user) until and unless the analytics server detects a PII requesting input element.

As the user is navigating through various web pages, the analytics server may be able to infer a PII requesting input element on the web page by analyzing the web page. The identification of a PII requesting input element by the analytics server may take any of numerous forms. In one example, the analytics server may monitor the web page displayed on the electronic device by periodically executing a data and/or screen scraping protocol, and identifying a set of characters and numerical data on the web page. The analytics server may then match the identified set of characters (e.g., string of characters or keywords) with one or more pre-defined key words. Upon matching of the identified set of characters with the one or more pre-defined key words, the analytics server may then confirm that the identified set of characters correspond to a predetermined criterion (e.g., predetermined set of words). For example, the analytics server may determine that the web page displayed on the browser application represents a request for PII because at least one set of alphanumerical characters match a predetermined key word.

In another example, the browser extension installed on the electronic device may scan the content of web page displayed and search for characteristics that signal presence of a PII requesting input element (e.g., shipping request or a payment input element). For example, the browser extension may compare a web page's content, URL, markup language tags, and/or any other suitable data to information such as at least one known keyword, which was previously identified as indicating the presence of a PII requesting input element. The at least one known keyword may have one or more corresponding descriptors that define a PII request. For instance, when the browser extension identifies presence of at least one of "shipping," "address," "zip-code," "credit card number," and "pin code," the browser extension notifies the analytics server that a PII requesting input element is identified.

In yet another example, the analytics server (via the browser extension) may identify input elements requesting PII on the web page by matching identification information and/or names of HTML code of the web page against a set of known PII-related terms or fields. The set of known PII-related terms and/or fields may be selected from a group consisting of address, zip code, street name, shipping information, and the like. In yet another example, the analytics server may parse the HTML code causing the electronic device to display the web page to determine occurrence of one or more characters on the web page matching with one or more pre-defined characters to determine a PII-related field. For instance, the analytics server may execute a scraping protocol to identify the words displayed on the web page. The analytics server may identify monitor the displayed words and input element identifiers to identify whether the match a predetermined word.

At step 220, the analytics server may, responsive to the web application executing on the user electronic device displaying an input element requesting personally identifiable information representing a shipping destination, input encoded user data corresponding to the input element, whereby a web application server hosting the web application does not receive the personally identifiable information representing the shipping destination.

The analytics server may use the above-described methods to identify whether an input element displaying on the electronic device is requesting PII. When the analytics server identifies that an input element is requesting PII of the user operating the electronic device, the analytics server may generate encoded user data. The analytics server may also input the encoded user data into the corresponding input element. The analytics server may use a variety of methods to generate the encoded user data. The analytics server may query and retrieve user data from an internal or external database. The user data corresponds to the data requested by the PII requesting input element. For instance, the analytics server may use unique identifiers of the electronic device (e.g., IP address, MAC address) or a unique identifier from the user operating the electronic device (e.g., login/password or other identifying information inputted by the user) to query a database and retrieve user's PII requested by the input element. For instance, when an input field requests the user's address, the analytics server may use a unique identifier of the user to retrieve the user's address from an internal/external database.

The analytics server may use any existing symmetrical and/or asymmetrical encryption methods such as private and public key encryption methods to generate encoded user data based on the retrieved user data. In an example, the analytics server may retrieve a random encryption key and use the retrieved encryption key to encode the user data. In another example, the analytics server may use a randomized token or revolving random string generator to generate a randomly generated alphanumerical string. The analytics server may then input the encoded user data onto the input element requesting user's PII.

Figure 3A:
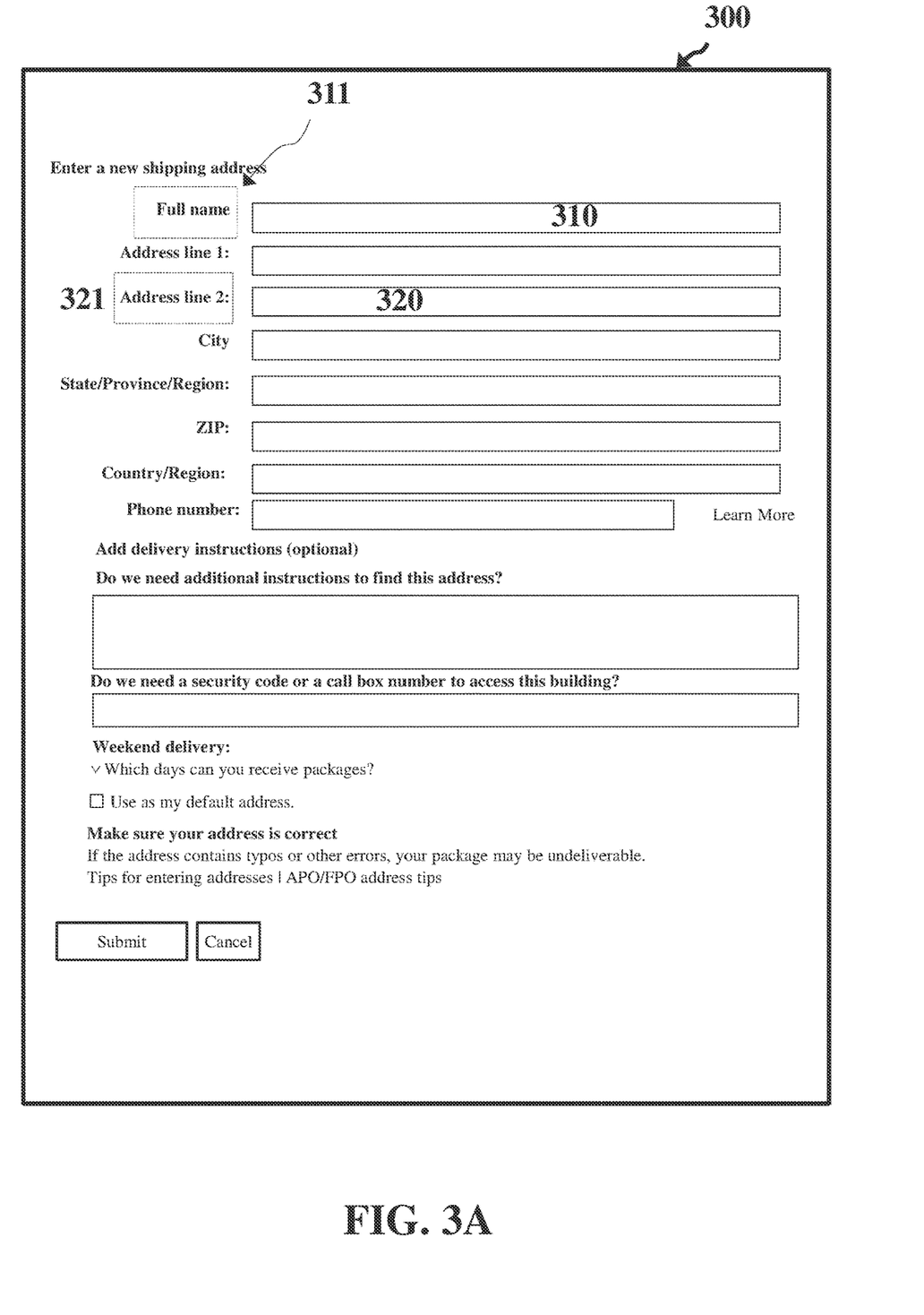
FIGS. 3A-3B illustrate examples of graphical user interfaces (GUIs) for a digital transaction, according to an embodiment.

Referring now to FIG. 3A, an example of a graphical user interfaces (GUI) for a digital transaction is illustrated, according to an embodiment. As described above, the analytics server may continuously monitor an electronic device and applications executing and/or displaying on the electronic device. GUI 300 is an example of a GUI that is displayed on an electronic device. GUI 300 includes multiple input elements with their corresponding identifier. For instance, GUI 300 includes an input element 310 and its corresponding identifier 311. The input element 310 may be an input element configured to receive a text string. The input element 310 may also have a corresponding identifier (e.g., the identifier 311) where the identifier conveys information (or a category of data) requested by the input element 310. For instance, the identifier 311 identifies that the user must input a full name in the input element 310. Even though all the input elements illustrated in the GUI 300 are text string input elements, this feature is not limited to text strings. For instance, an input element may be a radio button, drop-down menu, and the like.

The analytics server may use a browser extension executing in the background on the electronic device to determine when the GUI 300 is displayed on the electronic device. The GUI 300 may be a web page displayed as a result of the user navigating the World Wide Web. When the analytics server determines that the GUI 300 is displayed on the electronic device, the analytics server may use any of the above-described methodologies to identify the content of the GUI 300. For instance, the analytics server may execute a web scraping protocol to identify the text displayed within the GUI 300. In another example, the analytics server may directly contact the webserver causing the electronic device to display the GUI 300 and receive HTML code corresponding to the GUI 300. The analytics server may then parse the HTML code and execute various analytical protocols to identify different input elements and their corresponding identifiers displayed within the GUI 300.

The analytics server may also match the identifiers with one or more predetermined set identifiers to determine whether the input elements displayed on the electronic device are requesting PII from the user. As a result, the analytics server may determine which input elements are requesting PII. For instance, the analytics server determines that the input element 320 is requesting PII because its identifier 321 contains the word "address," which matches the predetermined list of PII requesting words.

Figure 3B:
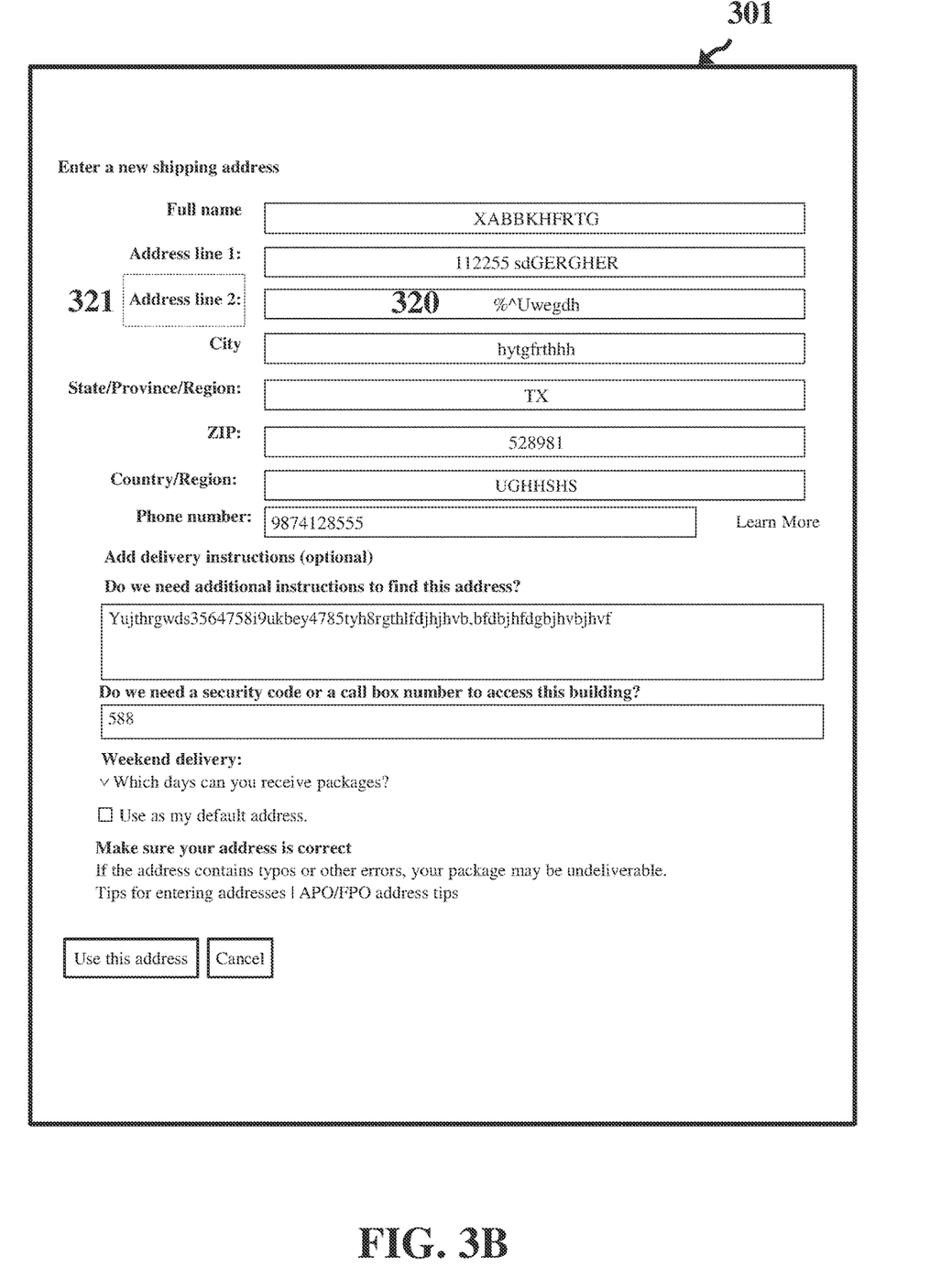

In response to identifying that an input element displayed the electronic device is requesting PII, the analytics server may generate encoded user data corresponding to the input elements. Referring now to FIG. 3B, an example of a GUI for a digital transaction is illustrated, according to an embodiment. Upon identifying that multiple input elements displayed on the electronic device are requesting PII (as described in FIG. 3A), the analytics server may input encoded information in the identified input elements. GUI 301 illustrates a GUI where the analytics server has inputted encoded user data in one or more identified input elements requesting PII.

Upon identifying that the input element 320 has an identifier that is requesting the user's PII (the user's address, as identified by the identifier 321), the analytics server retrieves the user's shipping information. The analytics server uses the user credentials (e.g., user's login information used to log into the browser extension) to retrieve the user information. In some other embodiments, the analytics server may use other unique data identifying the user to retrieve the user's shipping information. Upon retrieving user data, the analytics server encodes and encrypts the retrieved user data and inputs the encrypted/encoded user.

For instance, the analytics server retrieves the user's name (Joe Smith) and encrypts it to ("XABBKHFRTG"). The analytics server also retrieves the user's address (7528 Main Street) and encrypts to ("%^Uwegdh"). The analytics server may then input the encrypted address of the user ("%^Uwegdh") onto the input element 320. The analytics server then transmits encrypted user's PII to all input elements using the same method, as depicted in FIG. 3B. The analytics server may then submit the request using the encrypted user data.

In this way, the webserver hosting GUI 300 may not receive the user's PII. The webserver may only receive the encoded data depicted in FIG. 3B. As a result, in the event of a cyber-attack that leads to the webserver being compromised, the webserver does not possess the user's PII. Even if a hacker accesses the databases of the webserver, the hacker will only retrieve the user's encoded PII.

At step 230, the analytics server may, responsive to receiving a request for the personally identifiable information from a shipping entity server that received the encoded user data from the web application server, generate an optical code representing the personally identifiable information. When the electronic device transmits the request to the webserver, the webserver may process the request (using the encoded data) and transmit the request to a shipping entity server. The shipping entity server and/or the merchant webserver may then request the analytics server to generate an optical code representing the personally identifiable information of the user. The analytics server may then generate a media element corresponding to the encrypted user data. For instance, the analytics server may use a variety of methods to generate an optical code, such as a quick response (QR) code, barcode, and the like. The analytics server may transmit the optical code the webserver and/or directly to the shipping entity server.

In some configurations, the optical code may be included in a media element generated by the merchant webserver. For instance, the merchant webserver may process the request received from the electronic device using the encoded user data generated by the analytics server. The merchant webserver may also receive the optical code generated by the analytics server. Additionally or alternatively, the analytics server may transmit an instruction to the merchant webserver to include the optical code within the media element (e.g., shipping label). The merchant webserver may then generate the shipping label based on the encoded user data. If instructed by the analytics server, the merchant webserver may also include the optical code in the media element. An example of the media element is illustrated in FIG. 4.

Figure 4:
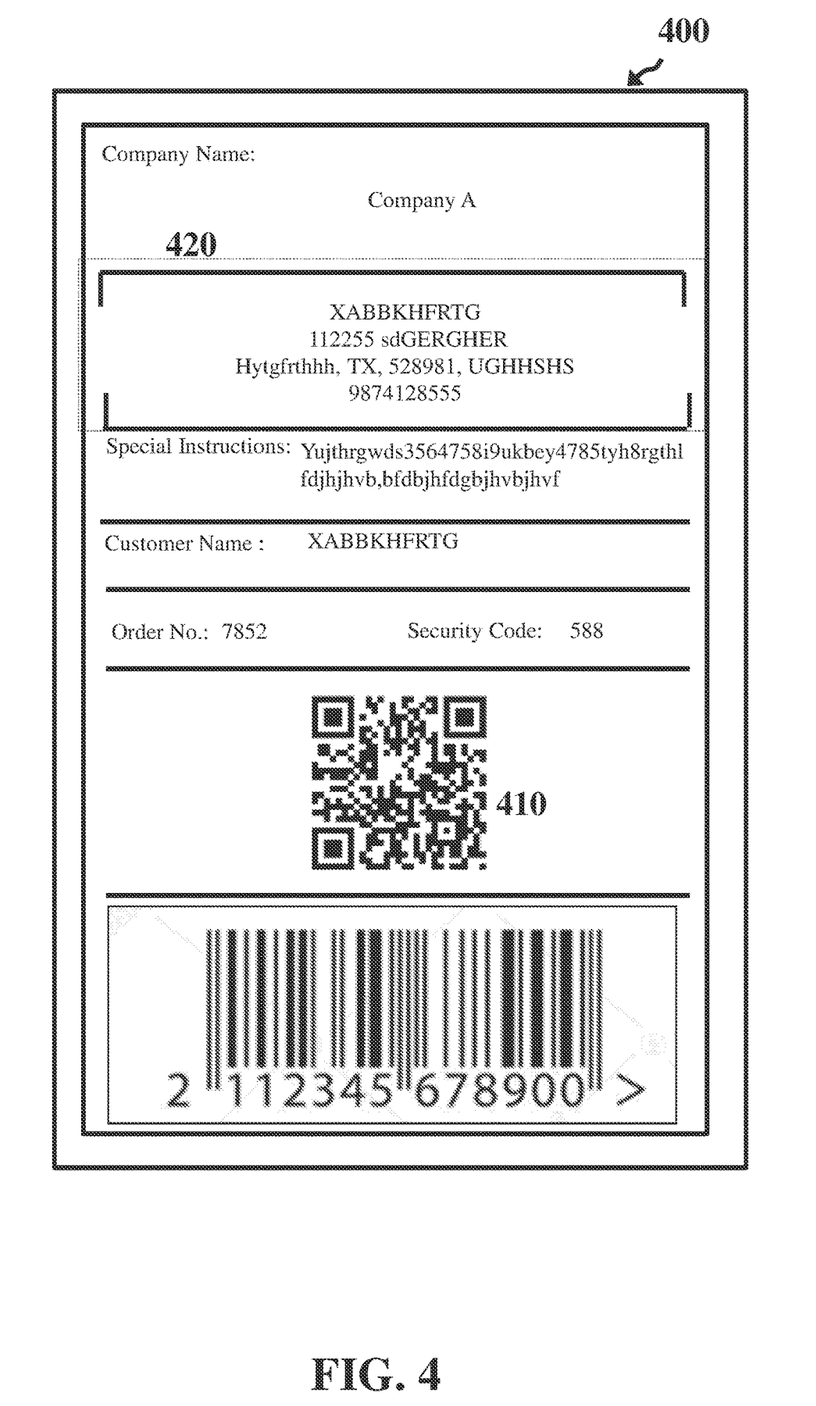
FIG. 4 illustrates an example of a media element corresponding to encoded user data (PII), according to an embodiment.

FIG. 4 illustrates an example of a media element corresponding to the encoded user data, according to an embodiment. The media element 400 is generated by the webserver (e.g., merchant or a third-party server hosting a merchant website) displaying the PII request on the electronic device (e.g., the GUI 300 and GUI 302 depicted in FIGS. 3A-B). Upon receiving the request from the electronic device including the encoded user data, the merchant webserver may process the request and execute a predetermined protocol and generate the media element 400. In one example, the media element 400 may be a shipping label. The media element 400 includes the encoded data generated by the analytics server. For instance, the data generated in the component 420 corresponds to the encoded data inputted in the input elements in GUI 302 in FIG. 3. The media element 400 may include the optical code 410 that is generated by the analytics server, as described above.

In some configurations, the media element is generated by the analytics server. The analytics server may receive a set of rules associated with the media element from the webserver and/or the shipping entity's server. For instance, the webserver and/or the shipping entity's server may transmit a set of rules regarding how to generate a shipping label to the analytics server. Accordingly, the analytics server may generate the media element and the optical code based on the encrypted user data.

At step 240, the analytics server may, responsive to receiving a request for the personally identifiable information from a shipping entity computing device that scanned the optical code from a shipping label, verify the shipping entity computing device. The analytics server may receive a request from a shipping entity computing device to display user's unencrypted PII. The shipping entity computing device may be any computing device associated with the shipping entity. The analytics server may receive an indication that a shipping entity computing device has interacted or accessed the optical code. For example, an electronic device purporting to be associated with the shipping entity may scan the optical code. In response, the analytics server may validate the identity of the electronic device. The analytics server may use a variety of authentication methods to verify the electronic device that has accessed or interacted with the optical code. For instance, the analytics server may require the electronic device purporting to be associated with the shipping entity to log in an existing application provided by the analytics server. In some configurations, the analytics server may utilize a biometric authentication method, such as fingerprint, retina scan, voice recognition, and the like.

At step 250, the analytics server may upon verifying the shipping entity computing device, present the personally identifiable information for display on the shipping entity computing device. Upon successful authentication of the electronic device by validating that the electronic device that has accessed/interacted with the optical code is truly associated with the shipping entity, the analytics server may present the personally identifiable information to the electronic device. For instance, the analytics server may display the PII on the electronic device. In another example, the analytics server may use augmented reality to display the PII on the electronic device, as depicted in FIGS. 5A and 5B.

Figure 5A:
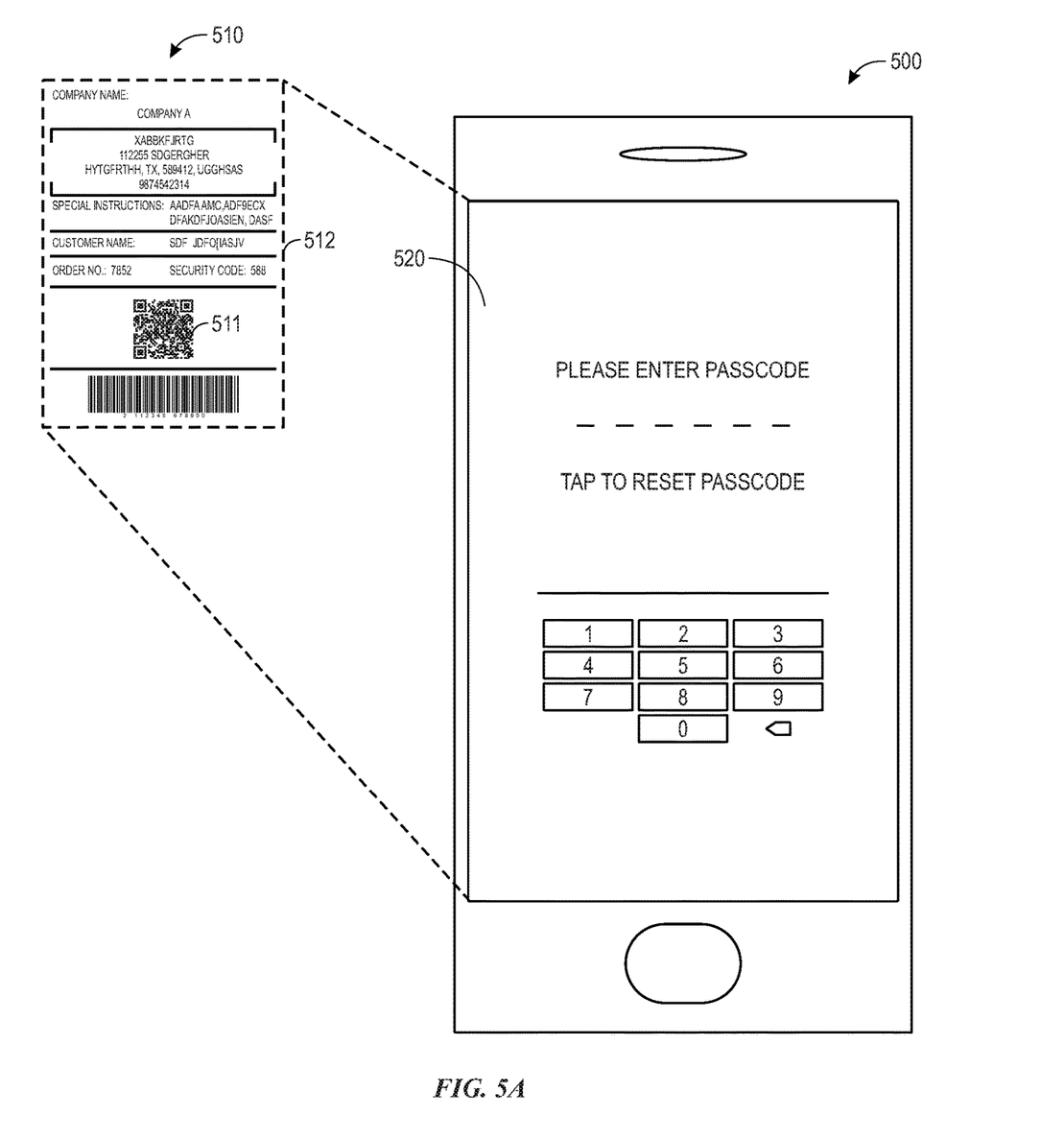
FIGS. 5A-B illustrate examples of displaying an unencrypted shipping label, according to an embodiment.
Figure 5B:
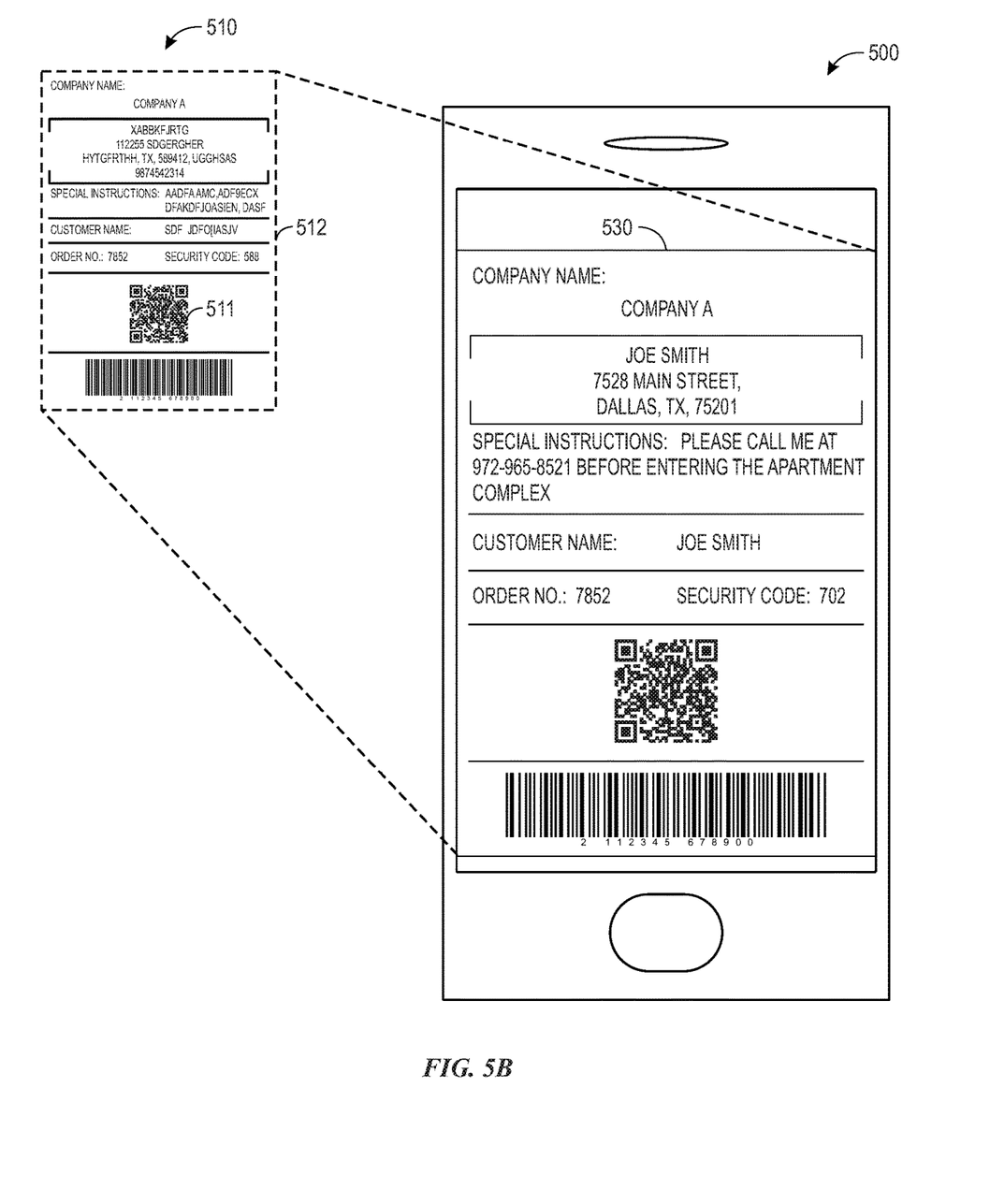

FIGS. 5A-5B illustrate an example of displaying an unencrypted shipping label, according to an exemplary embodiment. As depicted, the electronic device 500 may access an optical code within a shipping label 510 (similar to the shipping label 400 described in FIG. 4) for capturing an image of the QR 511. As described above, the QR code 511 is generated by the analytics server and corresponds to the encrypted user data (PII). For instance, the QR code 511 corresponds to the data displayed on the shipping label 510, such as components 512. When the analytics server receives an indication that the electronic device 500 and interacted with the QR code 511, the analytics server authenticates the electronic device 500. In some configurations, the analytics server retrieves a unique identifier of the electronic device 500 (e.g., IP address or MAC address) and validates the electronic device 500 when its unique identifier matches a pre-existing unique identifier. In other embodiments, the analytics server may display a prompt 520 on the electronic device 500 and require a user operating the electronic device 500 to enter a passcode. Upon matching the passcode entered by the user to a unique passcode generated for the shipping label 510, the analytics server may authenticate the electronic device 500.

Upon the passcode received from the electronic device 500 matching a passcode uniquely generated for the shipping label 510, the analytics server may display unencrypted user data on the electronic device 500. In an example, the analytics server may render a graphical user interface on the electronic device 500 where various input elements are populated with unencrypted user data. In some other embodiments, the analytics server may cause another electronic device (e.g., printer) to print a shipping label with unencrypted user data. In some other configurations, the analytics server may utilize augmented reality to display an encrypted version of the shipping label 510, as depicted in FIG. 5B.

FIG. 5B illustrates an example of the analytics server displaying a shipping label having unencrypted user data. The analytics server may use augmented reality to display an unencrypted version of the shipping label 510. For instance, when the electronic device 500 having an associate camera is pointing towards the shipping label 510, the analytics server may display the shipping label 530 on the electronic device 500. As depicted, the shipping label 530 mirrors the shipping label 510. However, the shipping label 530 includes unencrypted user data.

Even though certain aspects of the methods and systems described herein are described within the context of shipping entity, it is understood that the methods and systems described herein are not limited to encrypting PIT for shipping entities. Moreover, the encrypted PIT is also not limited to shipping data. In some configurations, the analytics server may use the methods and systems described herein to encrypt and decrypt payment information (e.g., credit card number). For instance, the analytics server may identify that a web page is requesting a user's payment information. The analytics server may then retrieve user data and submit encrypted user payment data to the web server. The analytics server may then decrypt the user's payment data when a payment facilitation server accesses an optical code associated with the user.

The foregoing method descriptions and the process flow diagrams are provided merely as illustrative examples and are not intended to require or imply that the steps of the various embodiments must be performed in the order presented. As will be appreciated by one of skill in the art the steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the principles of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

The previous description is of a preferred embodiment for implementing the invention, and the scope of the invention should not necessarily be limited by this description. The scope of the present invention is instead defined by the following claims.

What is claimed is:

1. A method comprising:
  monitoring, by a server, via a browser extension executing on an electronic user device, a web application displayed on the electronic user device;

responsive to the web application executing on the user electronic device displaying an input element requesting personally identifiable information representing a shipping destination, inputting, by the server, encoded user data corresponding to the input element, whereby a web application server hosting the web application does not receive the personally identifiable information representing the shipping destination;

responsive to receiving a request for the personally identifiable information from a shipping entity server that received the encoded user data from the web application server, generating, by the server, an optical code representing the personally identifiable information;

responsive to receiving a request for the personally identifiable information from a shipping entity computing device that scanned the optical code from a shipping label, verifying, by the server, the shipping entity computing device; and upon verifying the shipping entity computing device and verifying that a passcode input by a user of the shipping entity computing device matches a label-specific passcode that is generated specifically for use with the shipping label and is known by the server, presenting, by the server, decoded user data comprising the personally identifiable information for display in the form of a decoded augmented reality label comprising the decoded user data in lieu of the encoded user data on the shipping entity computing device.

2. The method of claim 1, further comprising:
filling, by the server, the input element with a randomly generated value, wherein the randomly generated value is a randomly generated alphanumerical value corresponding to an input type required by the input element.

3. The method of claim 1, wherein the browser extension is executing as a background process of the user electronic device.

4. The method of claim 1, wherein the server generates the optical code based on a randomized token.

5. The method of claim 1, wherein the server identifies whether the input element is requesting personally identifiable information based on one or more displayed keywords associated with the input element.

6. The method of claim 1, wherein the server identifies whether the input element is requesting personally identifiable information based on a category of the input element being at least one of payment information and shipping information.

7. The method of claim 1, wherein the optical code is a QR code or a barcode.

8. The method of claim 7, wherein accessing the optical code comprises scanning the barcode or the QR code by a device associated with a second server.

9. The method of claim 7, wherein presenting the decoded user data associated with a predetermined criterion comprises displaying the user data associated with the predetermined criterion on an electronic device in communication with a second server.

10. The method of claim 1, wherein the request for the personally identifiable information from the shipping entity computing device is received in response to the shipping entity computing device reading, via a camera, the shipping label.

11. A computer system comprising:
a web application server configured to execute one or more web applications on an electronic user device;
a shipping entity server associated with a shipping entity computing device configured to access a user's unencrypted data; and
a server in communication with the electronic user device, shipping entity, and
a merchant webserver, the server configured to:
monitor, via a browser extension executing on the electronic user device, a web application displayed on the electronic user device;
responsive to the web application executing on the user electronic device displaying an input element requesting personally identifiable information representing a shipping destination, input encoded user data corresponding to the input element, whereby the web application server hosting the web application does not receive the personally identifiable information representing the shipping destination;
responsive to receiving a request for the personally identifiable information from the shipping entity server that received the encoded user data from the web application server, generating, by the server, an optical code representing the personally identifiable information;
responsive to receiving a request for the personally identifiable information from a shipping entity computing device that scanned the optical code from a shipping label, verify the shipping entity computing device; and
upon verifying the shipping entity computing device and verifying that a passcode input by a user of the shipping entity computing device matches a label-specific passcode that is generated specifically for use with the shipping label and is known by the server, present decoded user data comprising the personally identifiable information for display in the form of a decoded augmented reality label comprising the decoded user data in lieu of the encoded user data on the shipping entity computing device.

12. The computer system of claim 11, wherein the server is further configured to: filling the input element with a randomly generated value.

13. The computer system of claim 12, wherein the randomly generated value is a randomly generated alphanumerical value corresponding to an input type required by the input element.

14. The computer system of claim 11, wherein the browser extension is executing as a background process of the user electronic device.

15. The computer system of claim 11, wherein the server generates the optical code based on a randomized token.

16. The computer system of claim 11, wherein the server identifies whether the input element satisfies a predetermined criterion based on one or more displayed keywords associated with the input element.

17. The computer system of claim 16, wherein the predetermined criterion is a category of the input element, the category being at least one of payment information, shipping information, and personally identifiable information.

18. The computer system of claim 11, wherein the optical code is a QR code or a barcode.

19. The computer system of claim 18, wherein accessing the optical code comprises scanning the barcode or the QR code by a device associated with a second server.

20. The computer system of claim 18, wherein presenting the decoded user data associated with a predetermined criterion comprises displaying the user data associated with the predetermined criterion on an electronic device in communication with a second server.

\* \* \* \* \*